United States Patent
Shinomoto et al.

[11] Patent Number: 6,110,023
[45] Date of Patent: Aug. 29, 2000

[54] SPHERE GRINDING APPARATUS

[75] Inventors: Masami Shinomoto; Hiroyuki Nojima; Katsuhisa Tonooka; Tomita Suzuki, all of Kanagawa, Japan

[73] Assignee: NSK Ltd., Tokyo, Japan

[21] Appl. No.: 09/285,237

[22] Filed: Apr. 2, 1999

[30] Foreign Application Priority Data

Apr. 2, 1998 [JP] Japan .................. 10-090165
Apr. 8, 1998 [JP] Japan .................. 10-096015

[51] Int. Cl.[7] .................................. B24B 7/17
[52] U.S. Cl. ................................ 451/262; 451/267
[58] Field of Search ............... 451/49, 50, 262, 451/124, 267, 331, 336, 337, 339

[56] References Cited

U.S. PATENT DOCUMENTS

| | | | |
|---|---|---|---|
| 3,173,230 | 3/1965 | Bovensiepen | 451/262 X |
| 3,348,338 | 10/1967 | Messerschmidt | 451/331 X |
| 3,791,083 | 2/1974 | Messerschmidt | 451/50 |
| 4,069,621 | 1/1978 | Gheorghe et al. | 51/117 |
| 5,353,550 | 10/1994 | Iwai et al. | 451/337 X |
| 5,520,573 | 5/1996 | Sumita et al. | 451/262 |
| 5,921,851 | 7/1999 | Suzuki et al. | 451/267 |

FOREIGN PATENT DOCUMENTS

| | | | |
|---|---|---|---|
| 1 223 618 | 2/1971 | United Kingdom . | |
| 2 259 036 | 3/1993 | United Kingdom | B24B 11/02 |

*Primary Examiner*—David A. Scherbel
*Assistant Examiner*—Anthony Ojini
*Attorney, Agent, or Firm*—Sughrue, Mion, Zinn, Macpeak & Seas, PLLC

[57] ABSTRACT

A sphere grinding apparatus (1) for grinding spheres by two discs consisting of a rotational disc (5) and a stationary disc (6), the sphere grinding apparatus (1) incorporating: a central shaft (3) slidable in an axial direction; and a housing (4) for rotatively supporting the central shaft (3), wherein the rotational disc (5) is joined to the central shaft (3) and the stationary disc (6) is joined to the housing (4). Accordingly, it is possible to provide a sphere grinding apparatus which is capable of improving a machining accuracy and which has a simple structure and the cost of which can be reduced.

8 Claims, 9 Drawing Sheets

SPHERE GRINDING APPARATUS

BACKGROUND OF THE INVENTION

The present invention relates to a sphere grinding apparatus for grinding spheres, and more particularly to a sphere grinding apparatus for grinding spheres for use in a rolling bearing, for example, ball bearing or the like. In addition, the present invention also relates to a sphere grinding method.

A conventional sphere grinding apparatus holds spheres between two grinding discs consisting of a rotational disc and a stationary disc to grind the spheres. The structure is formed such that only the rotational grinding disc (hereinafter called a "rotational disc") is rotatively borne. The stationary grinding disc (hereinafter called a "stationary disc") is connected to a rod of a hydraulic cylinder.

For example, an example of the sphere grinding apparatus has been disclosed in Japanese Patent Utility-Model Unexamined Publication No. 54-164189. As shown in FIG. 1, the sphere grinding apparatus 140 incorporates a rotational disc 105 and a stationary disc 106 disposed opposite to each other so that their central lines are made to be horizontal. Also in Japanese Patent Utility-Model Unexamined Publication No. 47-8599, an example of the sphere grinding apparatus has been disclosed. As shown in FIG. 2, the sphere grinding apparatus 150 incorporates a rotational disc 105 and a stationary disc 106 disposed opposite to each other so that their central lines are made to be vertical.

In each of the sphere grinding apparatuss 140 and 150, supply, discharge and circulation of the spheres between the rotational disc 105 and the stationary disc 106 are performed by an arbitrary means. When the central lines of the rotational disc 105 and the stationary disc 106 are made to be horizontal, that is, supply, discharge and circulation of the spheres in the sphere grinding apparatus 140 shown in FIG. 1 are performed by a method, for example, as shown in FIG. 3 which is an enlarged perspective view showing an essential portion.

In the grinding process, it is impossible to avoid a heat generation at a grinding portion, a rotationsl spindle, the another parts and so on. These heat generation may cause non-uniformed thermal expansion of the grinding apparatus. Particularly, since the sphere grinding apparatuss 140 and 150 shown in FIGS. 1 and 2 have the structure that the rotational disc 105 and the stationary disc 106 are supported such that the surfaces opposite to the facing surfaces of the two discs are supported, it is impossible to avoid such a heat generation in view of a structural design thereof. Therefore, influence of heat produced in a rotational spindle 103 and rise in the temperature of grinding solution are exerted. As a result, deviation in the centers of sphere guide grooves of the two discs and that in the parallelness of the opposite surfaces of the two discs take place. Therefore, there arises a problem in performing an operation for grinding spheres. That is, the sphericity of the produced spheres and the machining accuracy including roughness deteriorate.

Conventionally, some of idea for refraining the heat generation are suggested, for example, the use of the low thermal expansion material, the use of a bed which has a relatively small temperature raising characteristic and high rigidity, the use of compulsive cooling mechanism, and so on. However, such idea is accompanied with a remarkable design change and its corresponding cost-up. Further, there is a limit for completely preventing the deviation from generating.

To solve the above-mentioned problem, a sphere grinding apparatus has been disclosed in Japanese Patent Unexamined Publication No. 5-57602. As shown in FIG. 4, the sphere grinding apparatus 160 incorporates a central shaft 103 having a common central line; a sleeve 107 disposed to surround the central shaft 103 and permitted to be rotated; and a housing 104 for rotatively supporting the sleeve 107. A stationary disc 106 is joined to the central shaft 103, while a rotational disc 105 is joined to the sleeve 107. Thus, a dual structure is formed.

Since the sphere grinding apparatus 160 has the dual structure, the central shaft 103 and the sleeve 107 can be expanded such that the coaxial relationship is maintained even if heat is produced in the rotational spindle or the temperature of the grinding solution is raised. Therefore, deviation in the centers of the sphere guide grooves of the two discs and that in the parallelness of the opposite surfaces of the two discs do not easily take place. Thus, the problems of deterioration in the sphericity and the machining accuracy including the roughness which arise when spheres are ground can be prevented. However, errors in the rotational accuracy between the housing 104 and the sleeve 107 and errors in the rotational accuracy between the sleeve 107 and the central shaft 103 are accumulated. Thus, the errors becomes critical. Moreover, a large number of elements is required and assembly and adjustment become too complicated. As a result, there arises a problem in that the cost of the grinding apparatus cannot be reduced.

Although the above-mentioned structure does not sometimes arise any problem when the spheres are accommodated in a bearing for use in a conventional hard disk drive (HDD), adaptation to HDD, CD-ROM or other units having large capacities becomes unsatisfactory. For example, severe evaluation criteria are se t for runout of a nonrotational synchronous component (NRRO) Also a severe requirement has been made for the sphericity of the produced spheres and the machining accuracy including the roughness.

SUMMARY OF THE INVENTION

In view of the foregoing, an object of the present invention is to provide a sphere grinding apparatus and method which are capable of improving the machining accuracy, which has a simple structure and the cost of which can be reduced.

The above-mentioned object can be attained by a sphere grinding apparatus, according to the present invention, comprising:

a rotational disc having a sphere guide groove;

a stationary disc disposed opposite to the rotational disc and apart from the rotational disc by a predetermined distance, the stationary disc having a sphere guide groove which is opposed to the sphere guide groove of the rotational disc so as to guide spheres to be ground therebetween;

a rotational mechanism for rotating the rotating disc;

a conveyor for accommodating and conveying the spheres between an inlet and an outlet formed in a passage defined by the sphere guide grooves;

a pressing mechanism for pressing at least one of the rotating disc and the stationary disc against the other;

a central shaft slidable in an axial direction and joined to the rotational disc; and a housing joined to the stationary disc for rotatively supporting the central shaft.

In the sphere grinding apparatus, the housing on which the stationary disc is secured supports the central shaft directly, so that the center deviation of the sphere guide grooves of the stationary and rotational discs can be effectively prevented even if a thermal expansion is occurred therebetween. Accordingly, the sphere interposed between the stationary and rotational discs are never subjected to an eccentric load, to thereby be obtainable an sphere having excellent sphericity.

Moreover, the sphere grinding apparatus according to the present invention incorporates the stationary disc joined to the housing and the rotational disc joined to the central shaft rotatively supported by the housing so that spheres existing between the two discs are ground. Since the stationary disc is joined to the housing and the rotational disc is joined to the central shaft rotatively supported by the housing, influences of heat produced owning to rotations of the central shaft and rise in the temperature of the grinding solution can be reduced. Since the errors in the rotational accuracy are not accumulated, deviation between the centers of the two discs can satisfactorily be prevented. The parallel opposite surfaces of the two discs can be maintained. Moreover, a simple structure having a small number of elements is realized without a necessity of providing a rigid bed. Therefore, a low-cost sphere grinding apparatus can be provided.

In the above-mentioned sphere grinding apparatus, it is preferable that the housing is provided with a hydrostatic radial bearing for rotatably supporting the central shaft.

In the sphere grinding apparatus, in addition to the above-mentioned operation/operation, it is possible to maintain a excellent coaxial characteristics of the stationary and rotational discs and reduce a vibration in a radial direction when the central shaft is rotated. Accordingly, an sphere having more excellent sphericity can be obtained.

In the above-mentioned sphere grinding apparatus, it is preferable that the central shaft has a smaller diameter portion and a diameter portion, and the housing has a smaller diameter chamber substantially mating with the smaller diameter portion in a radial direction of the central shaft and a larger diameter chamber substantially mating with the larger diameter chamber in the radial direction, and in which the pressing mechanism comprises:

a pressure chamber extending in the axial direction and defined between the smaller diameter shaft and the larger diameter chamber, and a hydraulic pressure circuit for supplying oil to the pressure chamber.

In the sphere grinding apparatus, in addition to the above-mentioned operation/operation, it is possible to uniform a pressing force applied to the spheres, because the pressure is transmitted from the pressure chamber which is coaxially disposed with the central shaft. Accordingly, an sphere having more excellent sphericity can be obtained.

In the above-mentioned sphere grinding apparatus, it is preferable that the central shaft is provided with a spline member, and the rotational mechanism comprises a rotation drive member including a spline portion slidably coupled with the spline member in the axial direction so as to only transmitting a rotational force to the rotating disc.

With this structure in which a rotational force of the central shaft is transmitted through such a spline mechanism, the rotational force is only transmitted to the central shaft, so that the central shaft is never influenced by a rotational vibration of the driving source and the central shaft is not subject to a torque or moment caused by the deficiency of the driving source and so on. Accordingly, an sphere having more excellent sphericity can be obtained.

In the above-mentioned sphere grinding apparatus, it is preferable to further comprises pressure adjusting member for adjusting an average amount of grinding of the spheres per each grinding operation into a predetermined amount, in which the pressure adjusting member adjust at least one of a sphere conveying time of the conveyor and a pressing of the pressing mechanism.

With the above-mentioned apparatus, it is possible to control an average amount of grinding of the spheres per each grinding operation into an predetermined amount, in such a manner that at least one of a sphere conveying time of the conveyor and a pressing of the pressing mechanism is adjusted in accordance with a change of the number of lots (the number of spheres contained in a single lot, that is, the number of the spheres subjected to a grinding process repeatedly). Accordingly, a sphericity of each of spheres to be ground is improved, and also absolute values of the diameters of the spheres can be uniformed without depending upon an operator's feelings.

In the above-mentioned sphere grinding apparatus, it is preferable that the conveyor comprises:

an uniform plate for substantially uniforming a thickness defined by overlapped spheres conveyed on he conveyor.

With this apparatus, it is possible to suppress a change of the number of the spheres entered into a grinding space defined between the stationary and rotational discs within a predetermined time. Accordingly, a grinding force applied to each of the spheres can be uniformed, because a change in the number of the spheres existed within the grinding space can be controlled. Accordingly, an sphere having more excellent sphericity can be obtained.

Moreover, an another object of the present invention is to provide a sphere grinding method with which conditions under which balls are machined can be made to be constant and thus the final machining accuracy can be stabilized even if the number of balls varies in each lot.

To achieve the above-mentioned object, a sphere grinding method according to the present invention has the steps of previously determining the lot quantity which must be machined and setting each parameter before or during the machining operation to make an average quantity of grinding in each operation (an average value of quantities of reduction (nm/pass) of the diameters of the balls in each pass through the grinding circuit) to be a predetermined value in accordance with the determined lot quantity.

When an assumption is permitted that conditions, including the sharpness of the grindstone and the lapping solution which is supplied between the discs, are constant, each parameter is determined such that the machining pressure which is exerted on each ball is constant. When the condition is changed, it is preferable that the parameter setting conditions are corrected in accordance with change in the amount of grinding in each operation for grinding each lot.

DETAILED DESCRIPTION OF THE PREFERRED EMBODIMENTS

Figure 5:
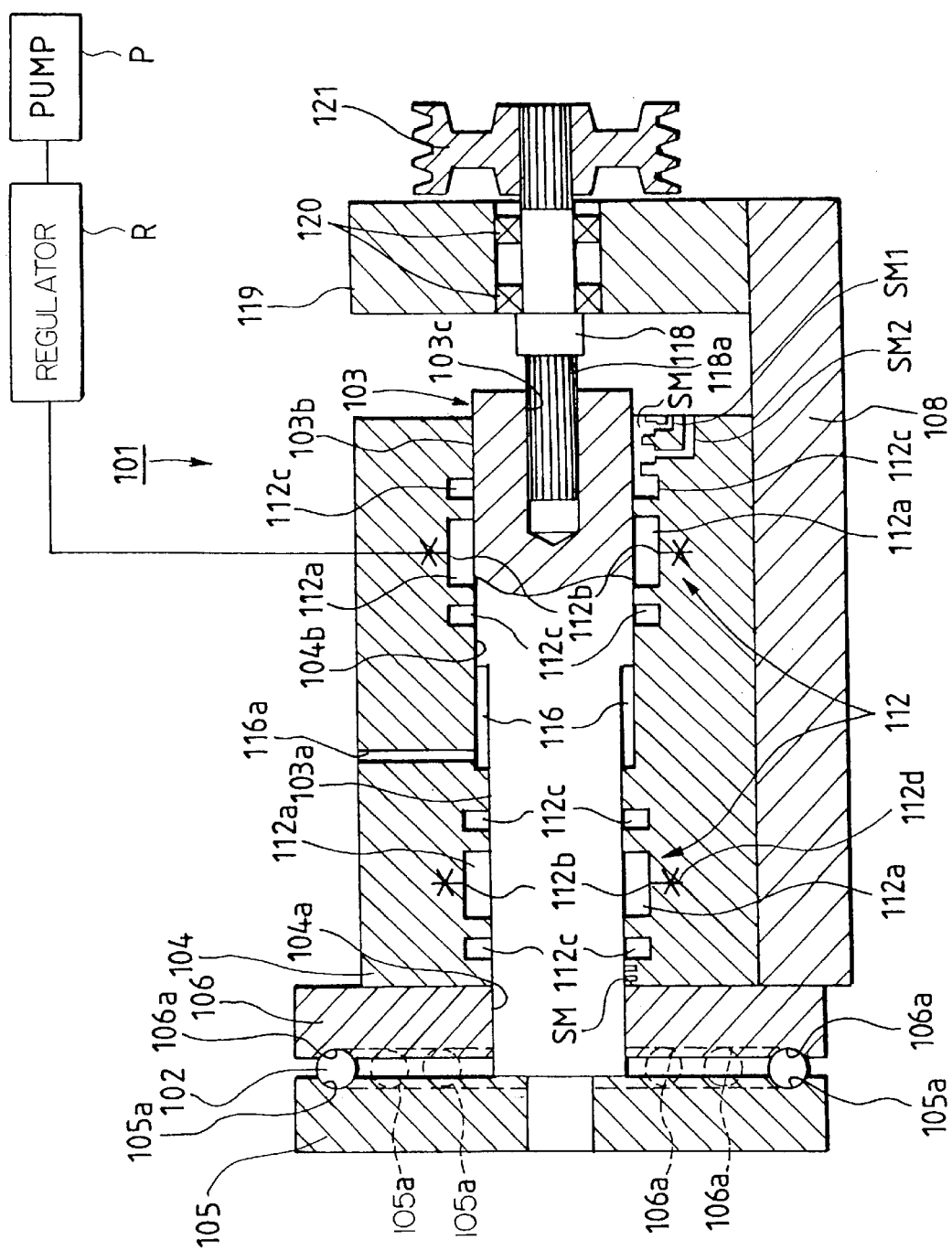
FIG. 5 is a vertical cross sectional view showing a sphere grinding apparatus according to an embodiment of the present invention.

Referring to the drawings, an embodiment of the present invention will now be described. FIG. 5 is a vertical cross sectional view showing a sphere grinding apparatus 101 according to the embodiment of the present invention. Note that common elements to those of the conventional sphere grinding apparatus are given the same reference numerals.

As shown in FIG. 5, the sphere grinding apparatus 101 has a structure that balls 102 are ground in a space between two discs which are a rotational disc 105 and a stationary disc 106. The sphere grinding apparatus 101 incorporates a central shaft 103 slidable in the axial direction and a housing 104 for rotatively supporting the central shaft 103. The rotational disc 105 is joined to the central shaft 103, while the stationary disc 106 is joined to the housing 104.

Figure 1:
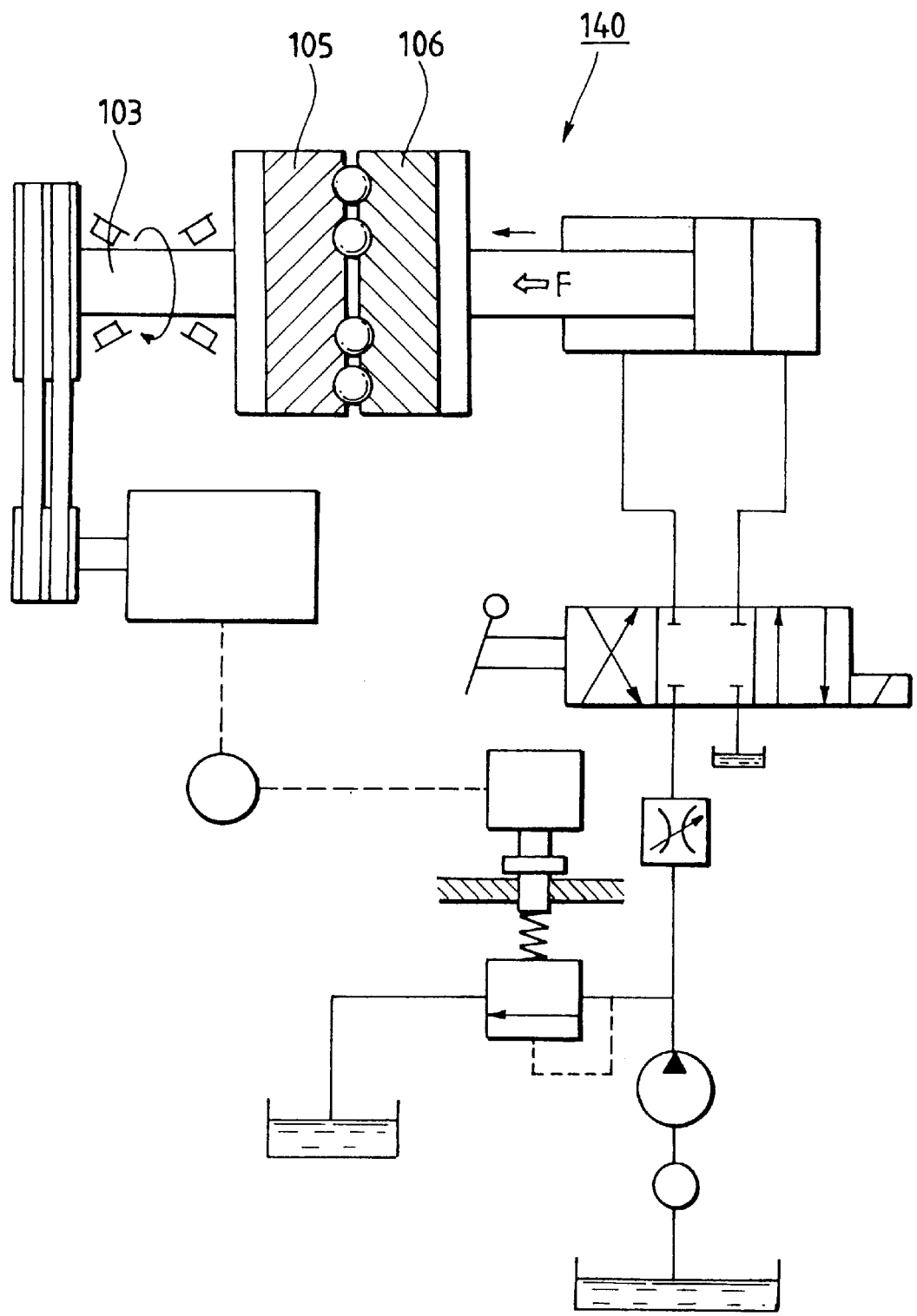
FIG. 1 is a schematic view showing a conventional sphere grinding apparatus.
Figure 2:
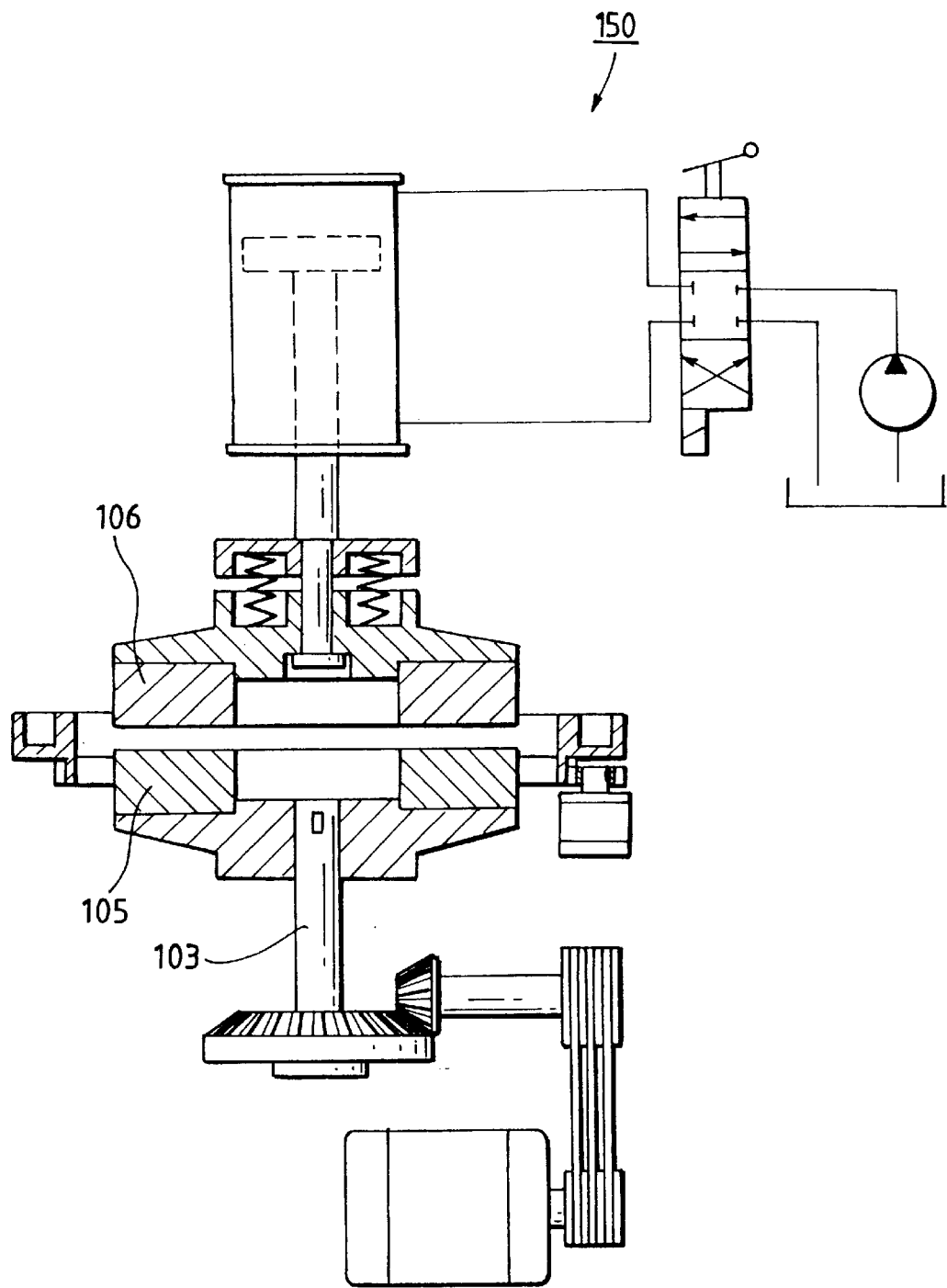
FIG. 2 is a schematic view showing another conventional sphere grinding apparatus.
Figure 3:
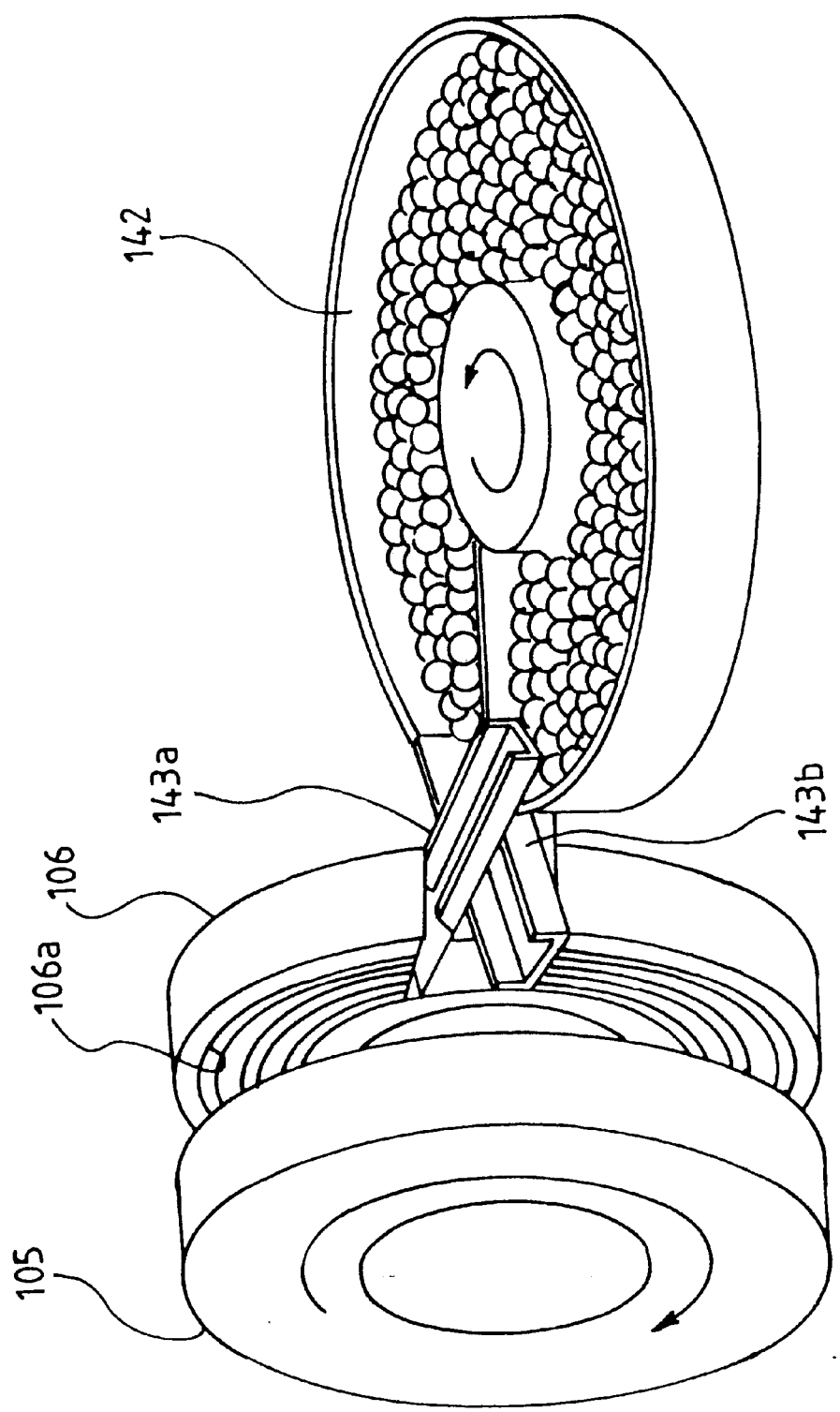
FIG. 3 is a perspective view showing a state of the connection between a conveyor and the sphere grinding apparatus shown in FIG. 1 or 5.
Figure 4:
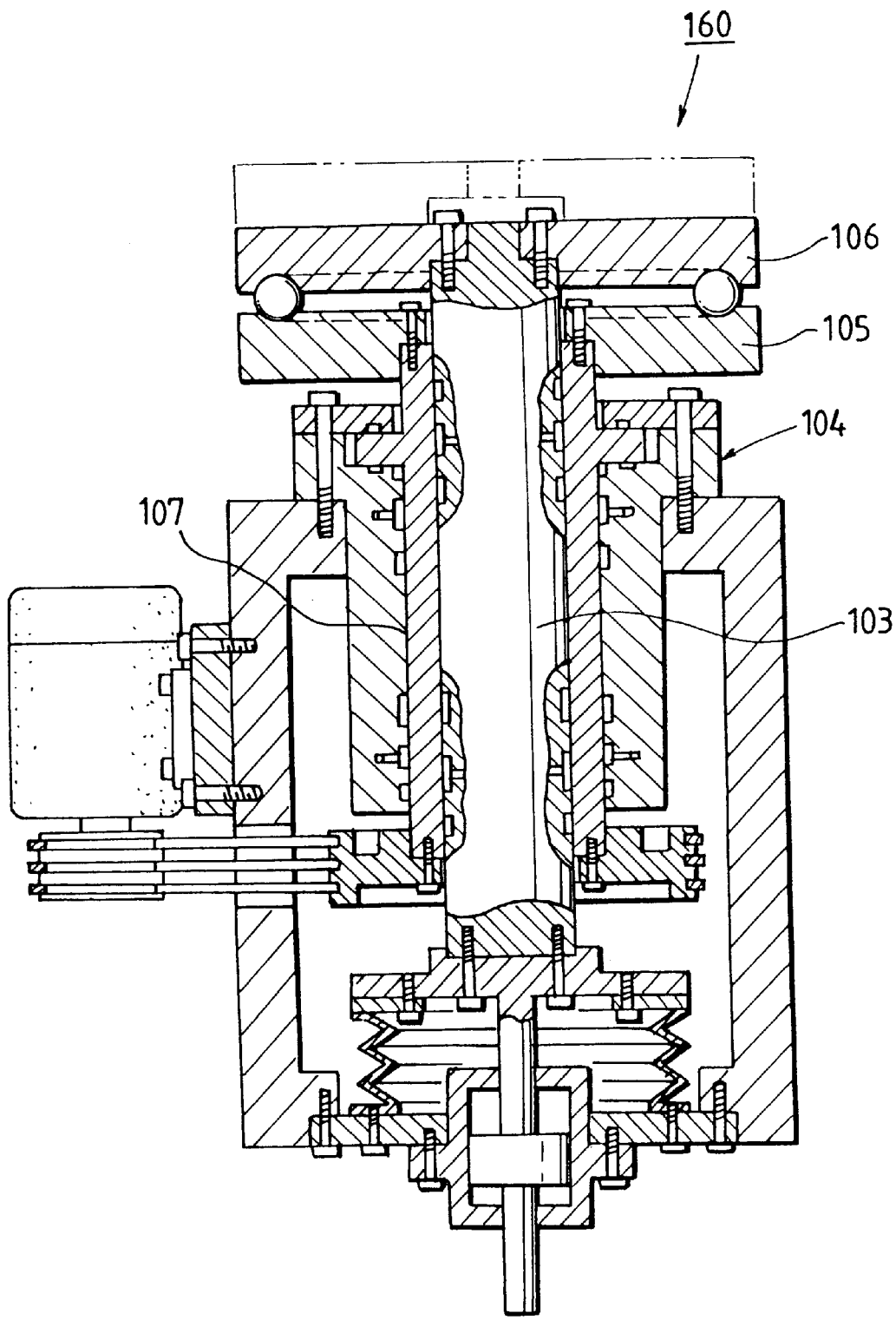
FIG. 4 is a vertical cross sectional view showing another conventional sphere grinding disc.

The housing 104 is joined to a bed 108. The circular stationary disc 106 is joined to the left-hand portion of the housing 104 when viewed in the drawing. The stationary disc 106 has cut portions for accommodating chutes 143a and 143b for introducing/discharging the spheres to and from a conveyor 142 arranged to perform supply, discharge and circulation of the spheres and structured as shown in FIG. 3. A plurality of sphere guide grooves 106a are concentrically provided for the stationary disc 106, the sphere guide grooves 106a having a curvature adaptable to a required spherical surface of each of the plural balls which must be finished.

A circular rotational disc 105 is joined to the left-hand portion of the central shaft 103 when viewed in the drawing. Similarly to the stationary disc 106, the rotational disc 105 has a plurality of sphere guide grooves 105a formed concentrically, each having a curvature adaptable to a required spherical surface of each of the plural balls which must be finished and formed opposite to the sphere guide grooves 106a of the stationary disc 106.

The central shaft 103 is supported by hydrostatic bearings 112 provided for the inside portion of the housing 104. Four hydrostatic bearings 112 are provided for the right and left portions in the circumferential direction. That is, eight hydrostatic bearings 112 are provided. Each of the hydrostatic bearings 112 is composed of a hydrostatic chamber 112a, an oil hole 112b and relief grooves 112c formed on the two sides of the hydrostatic chamber 112a. Eight oil holes 112b are connected to a hydraulic pressure circuit which incorporates a regulator, a pump and so forth. One end of each oil holes 112b is opened and communicated to the hydrostatic chamber 112a, and the other end thereof is communicated with a common regulator R, a pump P and so on. The hydraulic pressure circuit supplies a predetermined hydraulic pressure to the hydrostatic chamber 112a so that each of the hydrostatic bearings 112 is controlled.

A choke 112d is provided in each oil holes 112b. In this embodiment, although the choke 112d is formed within the housing, it is possible to provide the choke 112d outside the housing. In addition to this, as a choke 112d, it is possible to utilize a controllable choke.

The relief grooves 112c formed on the two sides of the hydrostatic chamber 112a in the axial direction are in the form of annular grooves. Oil discharged to the two side portions from the hydrostatic chamber 112a is discharged through the relief grooves 112c. Then, oil in the hydrostatic bearings 112 is discharged to the outside through a discharge opening (not shown) formed in the lower portion and communicated with the outside portion of the sphere grinding apparatus 101.

The central shaft 103 has a small-diameter portion 103a and a large-diameter portion 103b. The boundary between the small-diameter portion 103a and the large-diameter portion 103b is formed into a stepped shape. The stepped portion is formed between the right and left hydrostatic bearings 112. Also a hole in the housing into which the central shaft 103 penetrates is formed into a small-diameter opening 104a and a large-diameter opening 104b corresponding to the small-diameter portion 103a and the large-diameter portion 103b.

A pressure chamber 116 is formed between the small-diameter portion 103a and the large-diameter opening 104b. An oil hole 116a communicated with the hydraulic pressure circuit (not shown) is formed in the upper portion of the pressure chamber 116. The hydraulic pressure circuit supplies a predetermined hydraulic pressure to the pressure chamber 116 through the oil hole 116a. The central shaft 103 slidable in the axial direction constitutes a pressing mechanism. Note that the hydrostatic bearings 112 and the pressure chamber 116 are sealed by arbitrary sealing member SM (for example, air seals), in order to prevent a foreign matter from entering the inside of the hydrostatic bearings 112 from the outside and also to prevent the oil within the hydrostatic bearings 112 from flowing onto the grinding surfaces between the stationary and rotational discs.

More concretely, the seal members are provided at both ends of the hollow of the housing 104. In other words, the seal members are respectively disposed outside the hydrostatic bearings 112 in the axial direction. Each of the seal members comprises an two raw annular grooves. An air generated by a air pressure circuit (not shown) is supplied to one SM1 of annular grooves which is disposed outside, and the other SM2 of annular grooves which is disposed inside is communicated with atmosphere.

A spline groove 103c is provided for the large-diameter portion 103b of the central shaft 103. A spline portion 118a of a spline shaft 118 is engaged to the spline groove 103c. The central shaft 103 is held to be slidable in only the axial direction with respect to the spline shaft 118. The spline shaft 118 is, through two bearings 120, rotatively supported by a bearing member 119 joined to the bed 108.

A pulley 121 is secured to the right-hand side of the spline shaft 118 when viewed in the drawing. The pulley 121 is able to rotate by a motor (not shown) through a belt.

Note that although the spline shaft 118 is integrally provided with the pulley 121 side and a spline groove is formed on the central shaft 103 side in this embodiment, it is possible to use an alternative structure in which a spline shaft is formed on the central shaft side and a spline groove is formed on the pulley side.

The operation of the sphere grinding apparatus 101 according to this embodiment of the present invention will now be described.

When sphere materials have been supplied to the conveyor 142 structured as shown in FIG. 3, the sphere materials are supplied to the sphere guide grooves 106a through the inlet chute 143b. If the central shaft 103 is moved to the left when viewed in FIG. 5, supply of the spheres to the sphere guide grooves 106a can be facilitated. The two discs may manually be moved to positions apart from each other or by using an actuator provided individually.

To grind the supplied ball materials, the motor is rotated to rotate the pulley 121 through the belt. Thus, the rotational disc 105 joined to the central shaft 103 is rotated so that the ball materials 102 held between the grooves 105a and 106a revolve and rotate along the grooves 105a and 106a. Since grinding solution is sprayed during the movement of the ball materials 102, the ball materials 102 are ground. At this time, a predetermined hydraulic pressure is applied from the hydraulic pressure circuit to the pressure chamber 116 through the oil hole 116a. The central shaft 103 is slid to the right in the drawing to reduce the gap between the rotational disc 105 and the stationary disc 106. Thus, the grinding operation is accurately performed.

As described above, the stationary disc 106 is directly joined to the housing 104. Moreover, the rotational disc 105 is directly joined to the central shaft 103 which is rotatively supported by the housing 104. Therefore, even if heat is produced owning to the rotations of the central shaft 103 or the temperature of the grinding solution is raised, the coaxial relationship between the rotational disc 105 and the stationary disc 106 can be maintained. Since accumulation of errors in the rotational accuracy can be prevented, the merit of the hydrostatic bearing that accurate rotations can be realized can be maximally used. Deviation between the centers of the sphere guide grooves 105a of the rotational disc 105 and the sphere guide grooves 106a of the stationary disc 106 can be prevented. Therefore, the parallel opposite surfaces of the rotational disc 105 and the stationary disc 106 can be maintained.

Thus, the sphericity of the produced spheres and the roughness and the dimension accuracy can be improved. Since a simple structure having a small number of elements can be formed and a rigid bed is not required, a low-cost and smaller sized sphere grinding apparatus can be provided in order to obtain the same sphericity and the same dimensional accuracy and so on.

In addition to this, since a center deviation between the groove 106a of the stationary disc 106 and the groove 105a of the rotational disc can be prevented and a rotational vibration of the rotational disc can be remarkable reduced by the hydrostatic bearing 112, it is possible to prevent that the spheres are subjected to an eccentric large load or impact load during the grinding process. Accordingly, it is possible for the grinding apparatus according to the present invention to grind not only a steel sphere, but also a sphere made of brittle material such as a ceramic.

It is understood that the present disclosure of the preferred form can be changed in the details of construction and in the combination and arrangement of parts without departing from the spirit and the scope of the invention. For example, the sphere grinding apparatus according to the present invention may, of course, be applied to a sphere grinding apparatus of a type having the central axis which is disposed vertically. If a significant accuracy is not required, another bearing may be substituted for the hydrostatic bearing. For example, another structure may be employed in which a bronze sleeve is secured to the inside portion of the sleeve; the sleeve is used as a slide bearing; and oil is used as lubricant. The structure of the pressing mechanism for sliding the central shaft in the axial direction may be another structure if the central shaft can be slid. Also the structure for rotating the rotational disc may be another structure if the structure is able to rotate the rotational disc.

Hereinafter, described is examples of a method, according to the other aspect of the present invention, of preventing change in a machining condition between lots caused from a fact that the number in one lot (hereinafter called a "lot quantity") of spheres which must be machined is not constant and resulted variations in the finished dimension accuracy of the spheres among lots. In addition, it will be also explained that a method or a structure of uniform plate which can prevent a deviation in a finished dimension (that is, a dimension after completing the machining operation) of each balls in one lot from occurring. Accordingly, if the method according to the other aspect of the present invention is applied to the aforementioned sphere grinding apparatus according to the present invention, it is possible to remarkable improve a grinding quality of sphere to be ground. Further, if the uniform plate hereinafter described is applied to the apparatus, it is possible to improve the same more ensurely.

Figure 6:
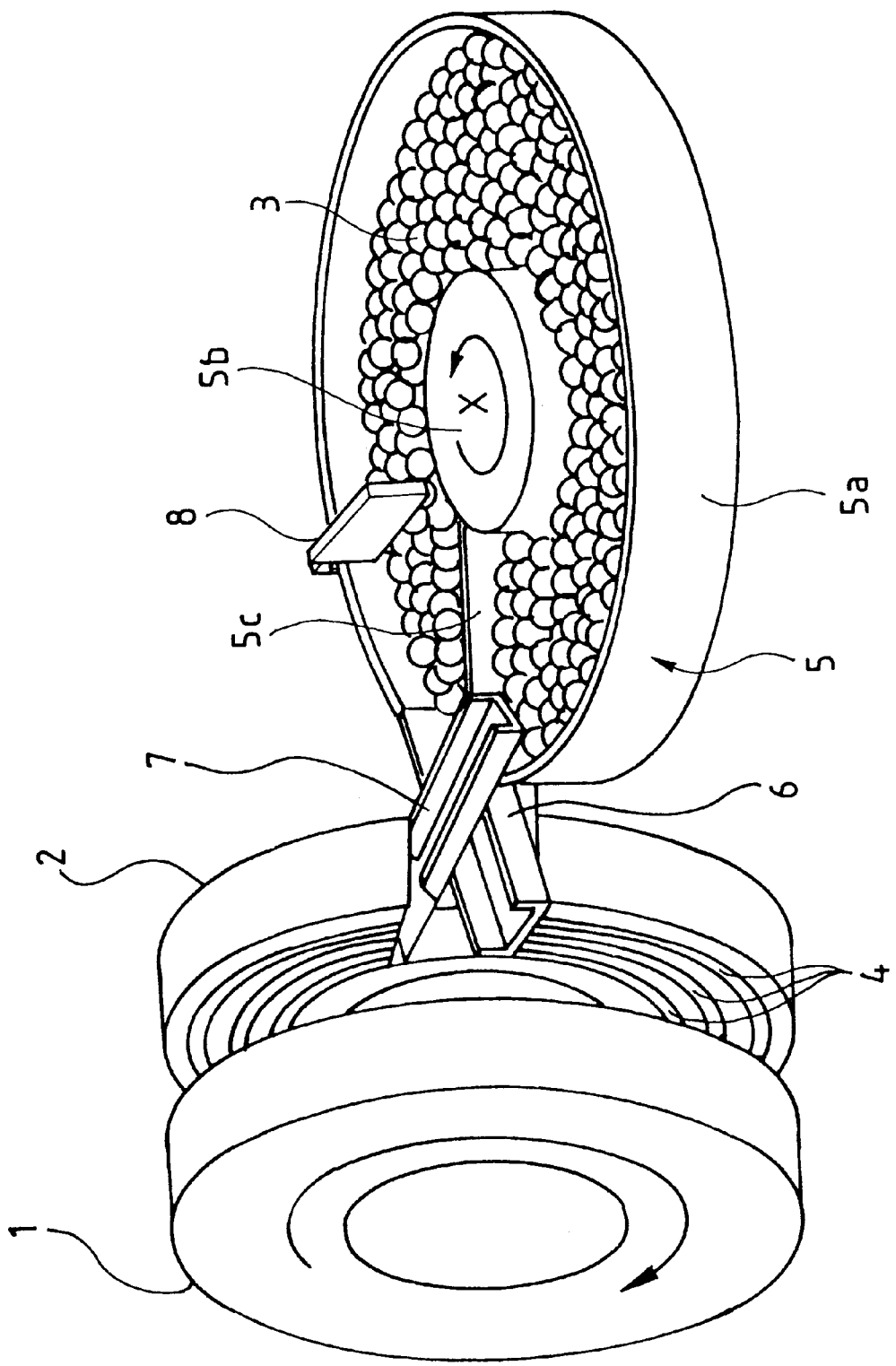
FIG. 6 is a perspective view showing an essential portion of a sphere grinding method according to the other aspect of the present invention.
Figure 7:
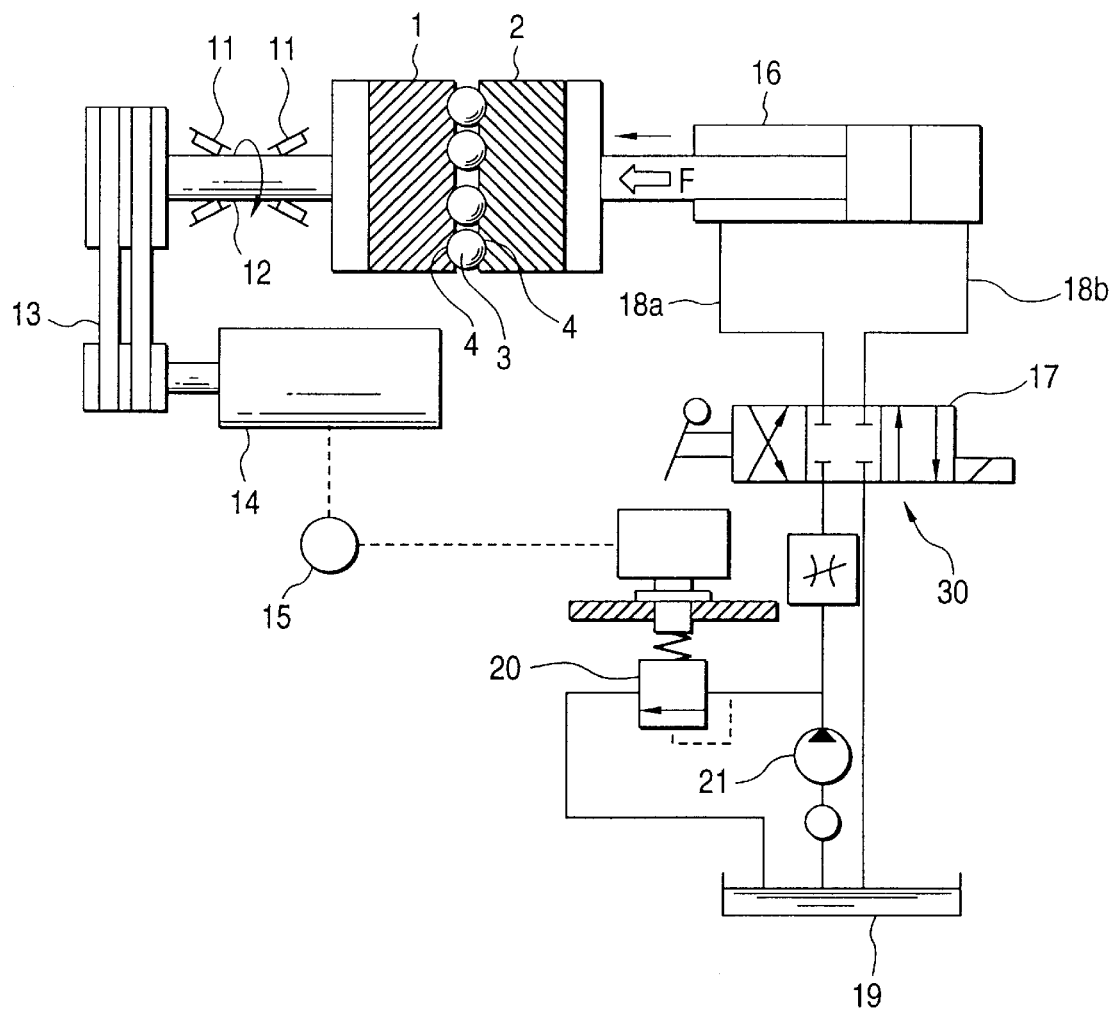
FIG. 7 is an overall structural view showing a sphere grinding method incorporating the essential portion shown in FIG. 6.
Figure 8:
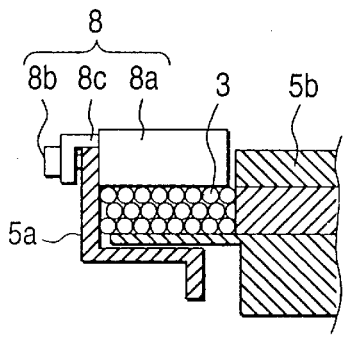
FIGS. 8(a)–8(e) are diagrams showing an example of a means for uniforming the heights of balls.
Figure 8:
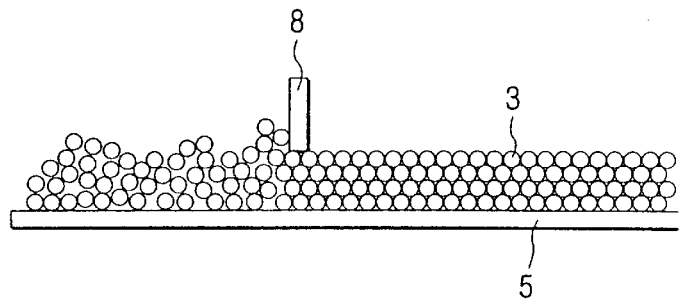
Figure 8:
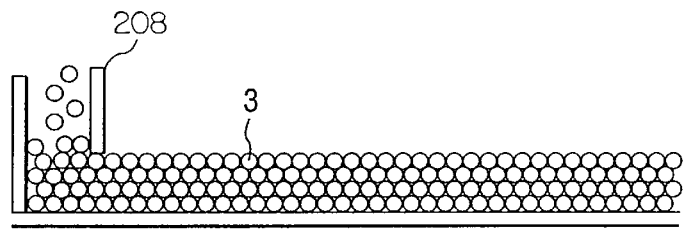
Figure 8:
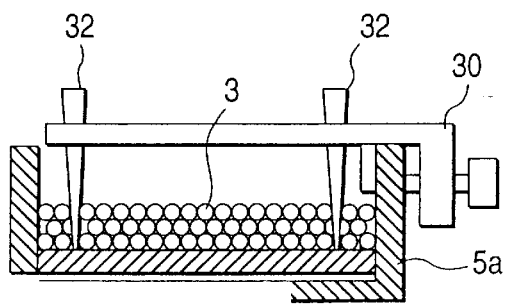
Figure 8:
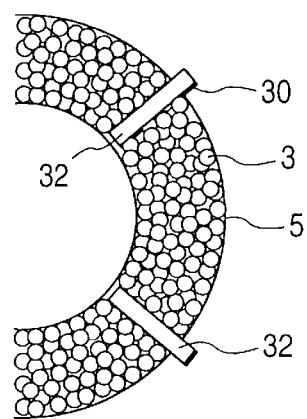

The examples of change preventing method according to the present invention is applicable not only the above-mentioned sphere grinding apparatus but also the other sphere grinding apparatus, so that at first we will explain one example of the other sphere grinding apparatus for better understanding with reference to the FIGS. 6–8.

FIRST EXAMPLE

A first example of change preventing method according to the other aspect of the present invention will now be described.

Figure 9:
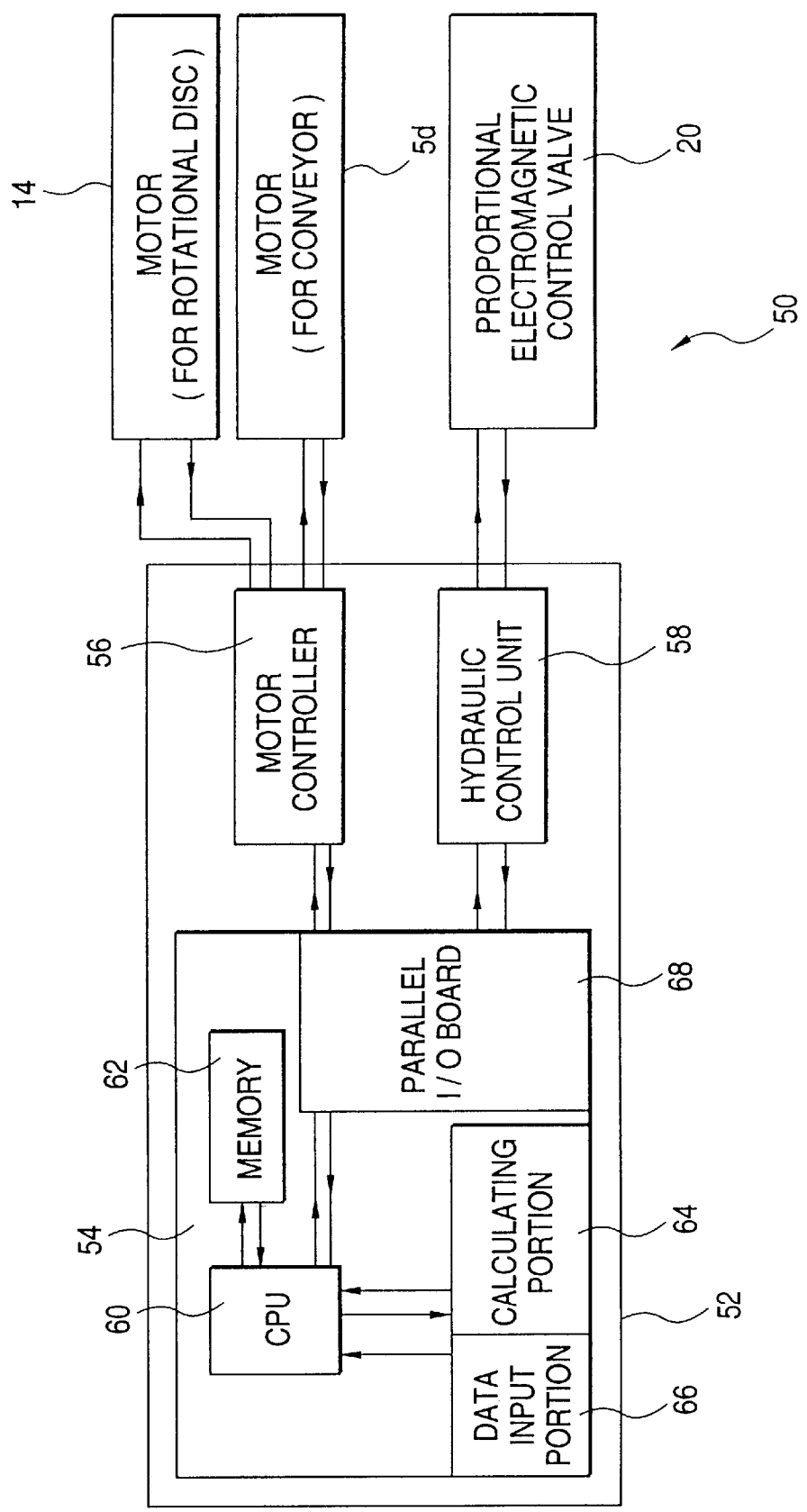
FIG. 9 is a block diagram showing a computer control system according to a second example.

The structure of a sphere grinding apparatus to which one example of the change preventing method according to the present invention is shown in FIGS. 6 to 8. FIG. 6 is a perspective view showing an essential portion of the sphere grinding apparatus. FIG. 7 is an overall structural view showing the sphere grinding apparatus having the essential portion shown in FIG. 6. FIG. 9 is an enlarged view showing an essential portion of a rotational conveyor shown in FIG. 6.

Referring to FIG. 6, each of a rotational disc 1 which is rotated by a disc rotating mechanism (not shown) and an opposite stationary disc 2 disposed on the same axis for the rotational disc 1 has a plurality of annular grooves (ball grooves) 4 each having a cross sectional shape approximating the curvature radius of the spheres 3 which must be ground and formed concentrically. The annular groove 4 of the rotational disc 1 and the annular grooves 4 of the stationary disc 2 are formed opposite to one another. A pair of opposite annular grooves 4 form one of grinding circuits for grinding the spheres 3.

Moreover, the sphere grinding apparatus incorporates a slide guide mechanism (not shown) for sliding and guiding either of the stationary disc 2 or the rotational disc 1 and a pressing mechanism, (given reference numeral 16 shown in FIG. 7) to be described later and arranged to press either of the discs against the other disc. The spheres 3 which must be ground are continuously supplied to the grinding circuits. In a state in which the rotational disc 1 is being rotated, the pressing mechanism is operated so that the grinding operation is performed.

The rotational conveyor 5 incorporates an outer wall 5a and a rotational portion 5b. The spheres 3 which must be machined at a time are accommodated in the rotational conveyor 5. The rotational portion 5b of the rotational conveyor 5 is, through a reduction mechanism 5e, rotated by a motor 5d accommodated below a lower portion of the outer wall 5a. The rotation of the motor 5d is controlled by a control unit 15 to be described later. An inlet chute 6 for supplying the spheres 3 accommodated in the rotational conveyor 5 to the grinding circuit and an outlet chute 7 for returning the spheres 3 ground in the grinding circuit to the rotational conveyor 5 are disposed between the stationary disc 2 and the rotational conveyor 5.

As shown in FIG. 7, a rotational shaft 12 borne by a pair of rolling bearings 11 is secured to the rotational disc 1. The rotational shaft 12 is rotated by a motor 14 through a belt transmission unit 13. The rotation of the motor 14 is controlled by the control unit 15. On the other hand, the stationary disc 2 is connected to a pressure cylinder mechanism 16 which is the pressing mechanism. The pressure cylinder mechanism 16 is connected to a hydraulic circuit 30 for adjusting the pressure of the stationary disc 2 which is exerted on the rotational disc 1. The hydraulic circuit 30 incorporates a direction switch valve 17, a proportional electromagnetic control-valve mechanism 20 and a hydraulic pump 21. Ports of the direction switch valve 17 are connected to conduits 18a and 18b connected to ports of the pressure cylinder mechanism 16. Ends of the conduits 18a and 18b are connected to an oil tank 19. The proportional electromagnetic control-valve mechanism 20 adjusts the pressure of oil which is supplied to each port of the pressure cylinder mechanism 16. Thus, the pressure which is exerted from the stationary disc 2 on the rotational disc 1 can be adjusted.

As shown in FIG. 8(a), a uniform plate 8 is provided for an upper portion of the inside portion of the outer wall 5a of the rotational conveyor 5 so that a space is formed in the lower portion. The uniform plate 8 incorporates a plate portion 8a, a fixing screw 8b for securing the plate portion 8a to the outer wall portion and a fixing member 8c. The lengthwise direction of the plate portion 8a coincides with the radial direction of the rotational conveyor 5. The surface of the plate portion 8a is perpendicular to the bottom surface of the rotational conveyor 5. The height of the uniform plate 8 is determined in accordance with the quantity of the balls, the capacity of the rotational conveyor and the cross sectional shape of the same.

Since the foregoing uniform plate is provided, the heights of the balls 3 accommodated in the conveyor 5 and arranged to be sent in be sent in a direction indicated by an arrow X shown in FIG. 6 can be made constant, as shown in FIG. 8(b). Therefore, a flow rate of the balls 3 per unit time from the conveyor 5 into the grinding circuit formed by the rotational disc 1 and the stationary disc 2 can be made constant. In general, when the ball has a small diameter, the weight of each ball is light. Therefore, the viscosity of lapping solution easily causes irregularity of the heights of the balls if the conveyor or the balls are wetted by the lapping solution. However, the structure according to this example is able to uniform the heights of the balls if the balls 3 have small diameters.

In this example, the pressure of the stationary disc 2 exerted by the pressure cylinder mechanism 16, the rotational speed of the conveyor 5 and the number of revolutions of the rotational disc 1 are changed to correspond to change in the lot quantity. Thus, the ball machining conditions are uniformed. A process for grinding one lot includes three machining steps consisting of coarse machining, medium machining and finish machining. To realize the machining speed and accuracy in the diameter adaptable to each machining step, the machining pressure, the speed of the rotational disc and the speed of the conveyor are adjusted. Specifically, attention is paid to the relationship between lot quantity S and average number N of balls 3 existing between the rotational disc 1 and the stationary disc 2 (hereinafter called the "grinding circuit") at a certain moment. Thus, parameters are controlled to make pressure p which is exerted on one ball to be constant if the lot quantity S is changed.

Probability F that one ball exists in the grinding circuit at a certain moment can be expressed by the following equation (1):

$$F=(2k/D)/(C+(2k/D)) \tag{1}$$

where D is the number of revolutions (rpm) of the rotational disc in one minute, C is time (minute/rotation) taken for the conveyor to perform one rotation and k is (an average value of the lengths of the plural grooves in the grinding circuit except for cut portions for forming the inlet chute 6 and the outlet chute 7)/(average diameter of the plural grooves in the grinding circuit X ratio of the circumference of a circle to its diameter) (hereinafter k is called as an "effective groove-length ratio").

When a fact that C is sufficiently larger than D is considered, equation (1) Is transformed as follows:

$$F=2k/(D \times C) \tag{2}$$

The number N of the balls existing in the grinding circuit can be expressed as follows in accordance with the lot quantity S and the probability F in the grinding circuit:

$$N=F \times S \tag{3}$$

The foregoing equation is transformed as follows because of equation (2):

$$N=(2k \times S)/(D \times C) \tag{4}$$

Assuming that the pressure which is exerted on the stationary disc 2 by the pressure cylinder mechanism 16 is P, force p which is exerted on one ball is a value obtained by dividing the force which is, by the pressure cylinder mechanism 16, exerted on all of the balls 3 existing in the grinding circuit with the number of the balls. Therefore, p can be expressed by the following equation in accordance with equation (4):

$$p=P/N=(P \times D \times C)/(2k \times S) \tag{5}$$

Therefore, p can be adjusted theoretically by changing P, D and C to correspond to change in S in each lot if S is changed.

In this example, a predetermined pressure p (kgf/piece) which is exerted on one ball is realized by the pressing mechanism which controls the pressure P to correspond to change in the lot quantity S.

Specifically, a case will now be considered in which balls are ground by a sphere grinding structured such that the effective groove length ratio of the stationary disc is such that k=0.875; and the machining force is generated by a hydraulic cylinder (having an effective area as the cylinder= 30 cm$^2$) which is adjusted by opening/closing a manual valve.

When a first lot is finally ground by the foregoing apparatus under the following conditions:

diameter of each steel sphere (ball): 2 mm
weight per unit volume: 7.8×10$^{-6}$ kg/mm$^3$
standard lot weight W: 9.8 kg standard rotational disc speed D: 20 rpm standard conveyor speed C: 15 min/rev standard machining duration: 20 hours (80 passes)

Note that the standard machining duration is total time to perform coarse machining, medium machining and finish machining.

In the foregoing case, the lot quantity S is as follows:

$$S=9.8\times1,000,000/32.7 \text{ nearly equal } 300,000$$

The number N of the spheres on which the machining pressure P is exerted is as follows in accordance with equation (4)(N=(2k S)/(D×C))

$$N=(2\times0.875\times300,000)/(20\times15)=1750$$

Therefore, machining pressure p which is exerted on one ball, that is, machining pressure P which realizes the following values:

standard coarse machining pressure: 200 gf/piece standard medium machining pressure: 150 gf/piece standard finish machining pressure: 100 gf/piece is as follows in accordance with equation (5)(p=P/N):

standard coarse machining pressure: 350 kgf (11.7 kgf/cm$^2$)

standard medium machining pressure: 263 kgf (8.8 kgf/cm$^2$)

standard finish machining pressure: 175 kgf (5.8 kgf/cm$^2$)

Therefore, the gauge pressure of the hydraulic cylinder in the initial stage for a first lot is, by operating the valve, set to be 11.7 kgf/cm$^2$. After the coarse machining operation has been completed, the gauge pressure is changed to 8.8 kgf/cm$^2$. After the medium machining operation has been completed, the gauge pressure is changed to 5.8 kgf/cm$^2$. As described above, the pressure cylinder mechanism 16 and the support member 30 are adjusted. After one lot has been machined, the operation for machining a next lot is started.

An assumption is made that the weight of the next lot is 8.0 kg. In the foregoing case, only the machining pressure P' is changed as follows so that force p' which is exerted on one ball is made to be the same as the force p which is exerted on one ball in the first lot. That is, $$S'=8\times1,000,000/32.7=245,000$$

$$N'=(2\times0.875\times245,000)/(20\times15)=1430$$

Therefore, the machining pressure P' required to make the machining pressure p which is exerted on one ball to be the same in the standard coarse machining pressure, the standard medium machining pressure and the standard finish machining pressure as that required when the weight of the lot is 9.8 kg is as follows in accordance with equation (5):

coarse machining pressure: 9.5 kgf/cm$^2$ medium machining pressure: 7.2 kgf/cm$^2$ finish machining pressure: 4.8 kgf/cm$^2$ Therefore, the gauge pressure of the hydraulic cylinder is, by adjusting the valve, set to be 9.5 kgf/cm$^2$ in the initial stage. The gauge pressure is changed to be 7.2 kgf/cm$^2$ after the coarse machining operation has been completed. Then, the gauge pressure is changed to 4.8 kgf/cm$^2$ after the medium machining operation has been completed. As a result of the above-mentioned machining operation, the machining pressure which is exerted on one ball is the same between the first lot and a next lot. Therefore, even if the lot quantities are different from each other between the two lots, the finished dimensions (the average value) of the two lots can be made to be the same.

A modification of this example will now be described.

FIG. 7 shows the structure that the pressure cylinder mechanism 16 serving as the pressing mechanism is provided for the stationary disc 2. The pressure cylinder mechanism 16 may be provided for the rotational disc 1. The machining operation may be performed in one or two steps.

If the thickness and the quantity of the balls on the conveyor are considerably varied, it is preferable that the uniform plate 8 is positioned apart from the outlet chute 7 to prevent overflow of the balls from the rotational conveyor 5 caused from existence of the uniform plate 8. When the thickness and the quantity of the balls on the conveyor are not varied considerably, the uniform plate 8 can be disposed adjacent to the outlet chute 7. The plate portion 8a may be provided for the outer wall 5a in order to permit the plate portion 8a to be moved along the outer wall 5a of the rotational conveyor 5.

FIG. 8(*a*) shows the structure that the uniform plate 8 is disposed in the upper portion of the inside portion of the outer wall 5a of the rotational conveyor 5 to uniform the heights of the balls. As shown in FIG. 8(*c*), a similar effect can be obtained when a hollow member 208 is connected to the outlet chute 7 of the rotational conveyor 5 to control a flow rate of the balls from the conveyor 5. The shape and the position of the hollow member are determined to be adaptable to the quantity of the balls and the capacity and the cross sectional shape of the rotational conveyor.

As an alternative to the inlet chute 6 and the outlet chute 7 according to the example, tubular members, such as vinyl hoses or pipes, may be employed to convey the balls. In the foregoing case, the quantity of conveyance of the balls is adjusted such that an allowance permitting the balls to always be moved in the tubular members is provided. As a result, the heights of the balls in the rotational conveyor 5 can be uniformed.

As an alternative to the uniform plate shown in FIG. 8(*a*), comb-shape members 32 may be provided for the outer wall 5a of the rotational conveyor 5 through a hydraulic circuit 30. The comb-shape members 32 having tapered leading ends are stood erect on the bottom surface of the conveyor such that the tapered leading end faces the bottom surface of the conveyor. Two comb-shape members 32 are disposed on the conveyor through the two hydraulic circuit 30 disposed in the radial direction of the conveyor at positions whereby the distances from the center of the conveyor are different from each other, as shown in FIG. 8(*e*). It is preferable that the comb-shape members 32 are made of bamboo. Any material which does not damage the ball may be employed.

When the comb-shape members are provided, the balls pass through the thin portions of the comb-shape members because the heights of the balls are large in a portion in which small quantity of the balls exists on the conveyor 5. In a portion on the rotational conveyor 5 in which a large quantity of the balls exists, the balls pass through the thick portions of the comb-shape members. Therefore, resistance against the balls is raised. Thus, the balls move at high speed in the portion in which a small quantity of the balls exist. In a portion in which a large quantity of the balls exist, the balls move at low speed. Therefore, the flow of the balls is uniformed as the machining operation is performed.

The uniform plate, the comb-shape members and the tubular members may be combined. It is preferable that the number and size (particularly, thickness) of the comb-shape members are changed to be adaptable to the quantity and size of the balls.

The effects of the uniform plate 8, the hollow member 208 or the comb-shape members 32 enable variations in the quantity of the balls which are supplied to the grinding circuit in a predetermined time to be prevented if the rotational speed of each of the rotational disc 1 and the rotational conveyor 5 is constant. Therefore, variations in the finished dimensions of the balls in a lot can be prevented as compared with the structure. The foregoing effect and that obtainable from the first example enables the dimensions of the balls among lots and those in the same lot to accurately be maintained.

SECOND EXAMPLE

A second example of change preventing method according to the other aspect of the present invention will now be described.

In this example, the pressure P exerted by the pressing mechanism is controlled to be adaptable to change in the lot quantity S, similarly to the first example. In this example, the pressure P is controlled by a computer control system structure as shown in FIG. 9. Similarly to the first embodiment, a hydrostatic rotational bearing is employed which rotatively bears the rotational disc 1. Moreover, a hydrostatic guide mechanism is employed as the slide guide mechanism.

A computer control system 50 structured as shown in FIG. 9 incorporates a control unit 52. The control unit 52 incorporates a computer portion 54, a motor controller 56 and a hydraulic-pressure control unit 58.

The computer portion 54 incorporates a central processing unit (CPU) 60, a memory portion 62, a calculating portion 64, a data input portion 66 and a parallel I/O board 68. The CPU 60 communicates data to and from the memory portion 62, the calculating portion 64 and the parallel I/O board 68 in accordance with data supplied from the data input portion 66. The computer portion 54 is connected to a motor controller 56 and a hydraulic-pressure control unit 58 through the parallel I/O board 68 so as to control the operations of the foregoing units.

The motor controller 56 is connected to the motor 14 for the rotational disc 1 and the motor 5d for the rotational conveyor 5. In response to a signal supplied from the computer portion 54, the motor controller 56 controls the foregoing motors.

The hydraulic-pressure control unit 58 is connected to the proportional electromagnetic control-valve mechanism 20 to control the proportional electromagnetic control-valve mechanism 20 in response to a signal supplied from the computer portion 54.

The computer control system 50 is operated as follows.

Parameters required to set the machining conditions are input by using the data input portion 66 (for example, a keyboard) The lot weight W must be input whenever the lot is changed. If the other conditions are input when the initial lot is machined, afterward input is not required. If the lot quantity S is known, the lot quantity S is input in place of the lot weight W. The other conditions include the diameter of each ball, the weight (which is not required when S is directly input) per unit volume, number of revolutions D (rpm) of the rotational disc per unit time, time C (min/rev) required for the rotational conveyor to perform one rotation force p1, p2 and p3 (gf/piece) which is exerted on one ball and which correspond to the processes (the coarse machining process, the medium machining process and the finish machining process) and the number of passes of the balls through the grinding circuit (the number of revolutions of the conveyor or the number of passes) or the machining duration. Note that the effective groove length ratio k is a characteristic value which is determined by the shape of the stationary disc and which has been registered in a control program.

A program for calculating the machining pressure P in each process has been stored in the memory portion 62 in accordance with the above-mentioned input values, similarly to the first example. The calculating portion 64 performs calculations in accordance with the program. In accordance with a result of the calculation, the hydraulic-pressure control unit 58 is controlled. The input values of the number of revolutions of each of the conveyor and the rotational disc are communicated to the motor controller.

As described above, the apparatus according to this example incorporates the hydrostatic rotational bearing and the hydrostatic slide to permit previous setting of various machining parameters thanks to the control function of the computer system.

The other structures and effects are the same as those according to the first example.

When the foregoing apparatus performs a finish grinding operation of a first lot under the following conditions, diameter of each steel sphere (ball): $\frac{1}{16}$ inch weight per unit volume: $7.8 \times 10^{-6}$ kg/mm$^3$ standard lot weight W: 10 kg standard rotational disc speed D: 40 rpm standard conveyor speed C: 12 min/rev standard machining duration: 20 hours (100 passes)

In the foregoing case, the lot quantity S ii as follows:

$$S = 10 \times 1000,000/16.3 \text{ nearly equal } 614,000$$

The number N of the spheres on which the machining pressure P is exerted is as follows in accordance with equation (4) (N=(2k S)/(D×C)):

$$N = (2 \times 0.875 \times 614,000)/(40 \times 12) = 2240$$

Therefore, machining pressure p which is exerted on one ball, that is, machining pressure P which realizes the following values:

standard coarse machining pressure: 150 gf/piece standard medium machining pressure: 100 gf/piece standard finish machining pressure: 60 gf/piece is as follows in accordance with equation (5) (p=P/N):

standard coarse machining pressure: 336 kgf (11.7 kgf/cm$^2$)

standard medium machining pressure: 224 kgf (8.8 kgf/cm$^2$)

standard finish machining pressure: 134 kgf (5.8 kgf/cm$^2$)

The foregoing sequential calculations are performed by the calculating portion 64 in accordance with the previously prepared program.

When the weight of a next lot which must be machined is 9 kg, lot weight W' is input through the initial setting screen of the computer system shown in FIG. 9. Thus, similarly to the foregoing case, lot quantity S' and the number N' of the balls on which the machining pressure is exerted are calculated by the calculating portion 64. Moreover, the machining pressure p which is exerted on each ball, that is, the machining pressure P' for realizing the standard coarse machining pressure, the standard medium machining pressure and the standard finish machining pressure are calculated by the calculating portion 64 by using the foregoing program.

coarse machining pressure: 302 kgf/cm$^2$ medium machining pressure: 201 kgf/cm$^2$ finish machining pressure: 121 kgf/cm$^2$ Therefore, the second example is able to easily perform the control as compared with the first example in which the pressure cylinder mechanism 16 and the support member 30 are adjusted.

THIRD EXAMPLE

A third example of change preventing method according to the other aspect of the present invention will now be described.

This example has a structure similar to that according to the second example. In this example, time C (the speed of the conveyor) taken for the conveyor to perform one rotation and the machining duration are controlled to be adaptable to change in the lot quantity. Thus, force p1, p2 and p3 which are exerted on each ball and which correspond to the coarse machining process, the medium machining process and the finish machining process can be made constant even if the lot is changed.

That is, S (or W) for each lot is input to the data input portion 66. Only in a first operation, the other conditions are input which include the diameter of each steel ball, the weight per unit volume, the number of revolutions D of the rotational disc per unit time, standard machining pressure P (kgf) and force p1, p2 and p3 which correspond to the coarse machining process, the medium machining process and the finish machining process and which are exerted on each ball and the number of passes.

When the machining conditions (the diameter of each steel ball, the weight per unit volume, the standard lot weight, the standard speed of the rotational disc, the standard conveyor speed and the standard machining duration) for the first lot are the same as those according to the second example and the standard machining pressure is 336 kgf in a case where the lot quantity S" of a next lot which must be machined is as follows:

$$S'':=(9 \times 1000,000)/16.3 \text{ nearly equal } 552,000$$

the machining pressure p which is exerted on each ball, that is, conveyor speed C" which realizes the following values:

standard coarse machining pressure: 150 gf/piece standard medium machining pressure: 100 gf/piece standard finish machining pressure: 60 gf/piece is calculated through the equation (5) (P=(P×D×C)/(2k×S)) by the calculating portion 64 to correspond to the coarse machining process, the medium machining process and the finish machining process in accordance with the prepared program. Then, change to the following values is automatically performed by the computer control system:

standard coarse machining: 10.8 min/rev standard medium machining: 7.2 min/rev standard finish machining: 4.3 min/rev Since the number of times (100 passes) for the balls to pass through the grinding circuit is made to be constant, also the machining duration is automatically changed in accordance with change in the conveyor speed. That is, when the coarse machining process, the medium machining process and the finish machining process are performed by passing the balls 40, 40 and 20 times (total number of passes is 100), standard coarse machining: 10.3 min×40=432 min standard medium machining: 7.2 min×40=288 min standard finish machining: 4.3 min×20=86 min the total machining duration is 806 minutes=13 hours and 26 minutes (when the conveyor speed is a constant value of 12 min/rev, 100 passes take 20 hours).

Although the standard machining pressure P is made to be constant in each process, it may be changed in each process. Thus, the conveyor speed may be constant regardless of the type of the process. For example, when P1=336 kgf, P2=224 kgf and P3=134 kgf in the foregoing case similarly to the second example and the conveyor speed for the first lot is 12 min/rev, the conveyor speed for a next lot is set to be 10.8 min/rev in each process. Therefore, the machining duration is 18 hours corresponding to 100 passes.

FOURTH EXAMPLE

A fourth example of change preventing method according to the other aspect of the present invention will now be described.

If the grooves of the rotational disc or the stationary disc are worn and the grinding efficiency deteriorates as a result of the machining operation in the third example, the machining pressure P is changed in addition to the change in the conveyor speed which is performed in accordance with equation (5). Thus, this example is structured to correct the machining pressure p which is exerted on each ball to maintain a predetermined range of the average value of amounts of abrasion (an average value of amounts of reduction in the diameters of the balls in each pass through the grinding circuit) in each operation.

The balls in each lot before and after the machining process were sampled to measure the diameters. An average value of amounts of abrasion of the balls in the first lot was 10 nm/pass. An average value of amounts of abrasion of the balls in a next lot was 9 nm/pass. In accordance with the foregoing results, the machining pressure P was raised by 20% in a next lot. Thus, an average amount of abrasion of the balls in the foregoing lot was 10 nm/pass. The foregoing operation can be performed by previously determining the relationship between change in the average amounts of abrasion and the machining pressures to prepare a table about the foregoing relationship.

A structure may be employed in which the table is stored in the memory portion 62, the average value of amounts of abrasion of the two lots is input to the data input portion 66 and a program for calculating correction values of P from the input values and the table is prepared so as to automatically change P.

In this example, correction of p is performed in addition to the structure of the third example, that is, p is maintained constant by changing the rotational speed of the conveyor so as to uniform the amounts of abrasion. As a matter of course, combination with the first example or the second example may be employed.

As described above, the change preventing method according to the other aspect of the present invention enables the force p which is exerted on each ball to be constant if the lot is changed in a case in which the numbers of balls which must be machined are varied among the lots. Thus, the machining conditions for the balls can be made constant and, therefore, an average amount of abrasion per one pass (per one pass through the grinding circuit) can be made constant. As a result, the accuracy of the final finishing operation can be stabilized. When the lot quantity is previously measured and simple calculations or simple input is performed, a constant machining operation can always be performed if the amount of balls which must be machined is changed in each lot. As a result, the accuracy of the machined balls can be stabilized.

If the sharpness of the grindstone is changed, the machining conditions are corrected in accordance with results of the two previous lots. Thus, the accuracy can furthermore be stabilized.

Therefore, if the above-mentioned method is applied to the sphere grinding apparatus according to the present invention, it is possible to remarkably improve an quality of the sphere to be ground.

The present invention is based on Japanese Patent Applications No. Hei. 10-90165 and Hei. 10-96015, which are incorporated herein by reference While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As described above, the sphere grinding apparatus according to the present invention incorporates the central shaft slidable in the axial direction and the housing for rotatively supporting the central shaft. The rotational disc is joined to the central shaft, while the stationary disc is joined to the housing. Therefore, influences of heat produced owning to the rotations of the central shaft and rise in the temperature of the grinding solution can be eliminated. Since accumulation of errors in the rotational accuracy can be prevented, deviation between centers of the two discs can be prevented. Thus, the parallel opposite surfaces of the two discs can be maintained.

Therefore, the sphericity, the roughness and the dimension accuracy of the produced spheres can be improved. Since a simple structure having a small number of elements can be realized and a rigid bed is not required, a low-cost sphere grinding apparatus can be provided.

What is claimed is:

1. A sphere grinding apparatus comprising:
   a rotational disc having at least one sphere guide groove;
   a non-rotatable disc mounted on a housing and disposed opposite to said rotational disc and apart from said rotational disc by a predetermined distance, said non-rotatable disc having a sphere guide groove opposed to each sphere guide groove of said rotational disc so as to guide spheres to be ground therebetween;
   a rotational mechanism for rotating said rotational disc;
   a conveyor for accommodating and conveying said spheres between an inlet and an outlet formed in at least one passage defined by the respective sphere guide grooves;
   a pressing mechanism for pressing at least one of said rotational disc and said non-rotatable disc towards the other; and
   a central shaft slidable in an axial direction and joined to said rotational disc;
   wherein the central shaft passes through said non-rotatable disc and is rotatably supported in said housing.

2. The sphere grinding apparatus according to claim 1, in which said housing is provided with a hydrostatic radial bearing for rotatably supporting said central shaft.

3. The sphere grinding apparatus according to claim 1, in which said central shaft has a smaller diameter portion and a large diameter portion, and said housing has a smaller diameter chamber substantially mating with said smaller diameter portion in a radial direction of the central shaft and a larger diameter chamber substantially mating with said large diameter portion in the radial direction of the central shaft, and
   in which said pressing mechanism comprises:
      a pressure chamber extending in the axial direction of the central shaft and defined between said smaller diameter portion of the central shaft and said larger diameter chamber of the housing, and
      a hydraulic pressure circuit for supplying oil to said pressure chamber.

4. The sphere grinding apparatus according to claim 1, in which said central shaft is provided with a spline member, and said rotational mechanism comprises a rotation drive member including a spline portion slidably coupled with said spline member in the axial direction so as to only transmitting a rotational force to said rotating disc.

5. The sphere grinding apparatus according to claim 1, further comprising:
   pressure adjusting member for adjusting an average amount of grinding of said spheres per each grinding operation into a predetermined amount,
   in which the pressure adjusting member adjust at least one of a sphere conveying time of said conveyor and a pressing of said pressing mechanism.

6. The sphere grinding apparatus according to claim 1, in which said conveyor comprises:
   an uniform plate for substantially uniforming a thickness defined by overlapped spheres conveyed on the conveyor.

7. The sphere grinding apparatus according to claim 5, in which said conveyor comprises:
   an uniform plate for substantially uniforming a thickness defined by overlapped spheres conveyed on the conveyor.

8. The sphere grinding apparatus according to claim 1, wherein said central shaft is directly and rotatably supported in said housing.

* * * * *